United States Patent
Freeman et al.

(10) Patent No.: US 11,187,099 B1
(45) Date of Patent: Nov. 30, 2021

(54) TURBINE SHROUD WITH CONTAINMENT FEATURES

(71) Applicant: Rolls-Royce Corporation, Indianapolis, IN (US)

(72) Inventors: Ted J. Freeman, Danville, IN (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/075,261

(22) Filed: Oct. 20, 2020

(51) Int. Cl.
*F01D 11/08* (2006.01)
*F01D 25/26* (2006.01)
*F01D 25/28* (2006.01)

(52) U.S. Cl.
CPC .............. *F01D 11/08* (2013.01); *F01D 25/26* (2013.01); *F01D 25/28* (2013.01); *F05D 2240/11* (2013.01); *F05D 2300/6033* (2013.01)

(58) Field of Classification Search
CPC .......... F01D 11/08; F01D 25/26; F01D 25/28; F05D 2240/11; F05D 2300/6033
See application file for complete search history.

(56) References Cited

U.S. PATENT DOCUMENTS

| | | | |
|---|---|---|---|
| 6,884,026 B2 * | 4/2005 | Glynn | F01D 11/08 415/113 |
| 7,726,936 B2 * | 6/2010 | Keller | F01D 11/12 415/173.4 |
| 8,206,092 B2 | 6/2012 | Tholen et al. | |
| 9,976,435 B2 | 5/2018 | Borja et al. | |
| 10,280,782 B2 | 5/2019 | McCaffrey et al. | |
| 10,563,535 B2 | 2/2020 | Vetters et al. | |
| 10,590,803 B2 * | 3/2020 | Quennehen | F01D 25/246 |
| 10,655,501 B2 * | 5/2020 | Lepretre | F01D 25/246 |
| 2014/0271147 A1 * | 9/2014 | Uskert | F01D 11/22 415/173.2 |
| 2016/0186611 A1 * | 6/2016 | Vetters | F01D 9/04 415/173.2 |
| 2021/0148251 A1 * | 5/2021 | Freeman | F01D 25/246 |
| 2021/0189897 A1 * | 6/2021 | Sippel | F01D 11/08 |
| 2021/0189909 A1 * | 6/2021 | Sippel | F01D 25/246 |

* cited by examiner

*Primary Examiner* — Igor Kershteyn
(74) *Attorney, Agent, or Firm* — Barnes & Thornburg LLP

(57) ABSTRACT

An assembly adapted for use in a gas turbine engine includes a carrier and a blade track segment. The carrier extends at least partway about an axis. The blade track segment is supported by the carrier radially relative to the axis to define a portion of a gas path of the assembly.

20 Claims, 5 Drawing Sheets

TURBINE SHROUD WITH CONTAINMENT FEATURES

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

A turbine shroud adapted for use in a gas turbine engine may include a carrier, a first turbine shroud, and a second turbine shroud. The carrier may comprise metallic materials and may be arranged to extend circumferentially at least partway about a center axis. The second turbine shroud may be arranged circumferentially adjacent to the first turbine shroud segment.

In some embodiments, the first turbine shroud segment may include a first blade track segment and a first intermediate carrier. The first blade track segment may comprise ceramic matrix composite materials. The first intermediate carrier may be configured to couple the first blade track segment to the carrier.

In some embodiments, the first blade track segment may be formed to include a first runner, a first fore mount post, and a first aft mount post. The first runner may be shaped to extend circumferentially partway around the center axis. The first fore mount post and the first aft mount post may each extend radially outward from the first runner. The first aft mount post may be spaced apart axially from the first fore mount post to define a first channel therebetween.

In some embodiments, the first intermediate carrier may include a first intermediate carrier body and at least two first intermediate carrier pins. The first intermediate carrier body may be arranged in the first channel axially between the first fore mount post and the first aft mount post. The two first intermediate carrier pins may each extend axially into the first fore mount post, the first intermediate carrier body, and the first aft mount post to couple the first intermediate carrier body to the first blade track segment.

In some embodiments, the second turbine shroud segment may include a second blade track segment and a second intermediate carrier. The second blade track segment may comprise ceramic matrix composite materials. The second intermediate carrier may be configured to couple the second blade track segment to the carrier.

In some embodiments, the second blade track segment may be formed to include a second runner, a second fore mount post, and a second aft mount post. The second runner may be shaped to extend circumferentially partway around the center axis. The second fore mount post and the second aft mount post may each extend radially outward from the second runner. The second aft mount post may be spaced apart axially from the second fore mount post to define a second channel therebetween.

In some embodiments, the second intermediate carrier may include a second intermediate carrier body and at least two second intermediate carrier pins. The second intermediate carrier body may be arranged in the second channel axially between the second fore mount post and the second aft mount post. The two second intermediate carrier pins may each extend axially into the second fore mount post, the second intermediate carrier body, and the second aft mount post to couple the second intermediate carrier body to the second blade track segment.

In some embodiments, the second intermediate carrier body may be shaped to define a flange and the first intermediate carrier body may be shaped to include a groove. The flange of the second intermediate carrier body may extend circumferentially from a circumferential end of the second intermediate carrier body into the groove formed in an adjacent circumferential end of the first intermediate carrier body.

In some embodiments, the flange may extend into the groove so that one pin of the at least two first intermediate carrier pins extends axially through the first intermediate carrier body and the flange of the second intermediate carrier body to form a joint between the first intermediate carrier and the second intermediate carrier. The joint may couple the first intermediate carrier to the second intermediate carrier to share loading therebetween and close a gap between the first turbine shroud segment and the second turbine shroud segment.

In some embodiments, the first intermediate carrier may further include a plurality of first intermediate carrier retainers. The plurality of first intermediate carrier retainers may each extend radially and couple the first intermediate carrier body with the carrier.

In some embodiments, the second intermediate carrier may further include a plurality of second intermediate carrier retainers. The plurality of second intermediate carrier retainers may each extend radially and couple the second intermediate carrier body with the carrier.

In some embodiments, the plurality of first intermediate carrier retainers may include two first intermediate carrier retainers. In some embodiments, the plurality of second intermediate carrier retainers may include two second intermediate carrier retainers.

In some embodiments, the second intermediate carrier body may be shaped to include a forward side surface and an aft side surface. The aft side surface may be spaced apart axially from the forward side surface.

In some embodiments, the circumferential end may extend between and interconnect the forward side surface and the aft side surface. Edges of the flange may be spaced apart axially from the forward side surface and the aft side surface of the second intermediate carrier body. In some embodiments, edges of the flange of the second intermediate carrier may be spaced apart axially from edges of the circumferential end of the second intermediate carrier body.

In some embodiments, the first intermediate carrier body may be shaped to include a flange. The flange may extend circumferentially from the adjacent circumferential end of the first intermediate carrier body to form the groove.

In some embodiments, the flange of the first intermediate carrier body may extend into a groove formed by the flange of the second intermediate carrier body. The flange of the first intermediate carrier body may engage the flange of the second intermediate carrier body.

In some embodiments, one pin of the two first intermediate carrier pins may extend axially through the flange of the first intermediate carrier body and the flange of the second intermediate carrier body to form the joint. In some embodiments, the flange of the second intermediate carrier body may axially overlap the flange of the first intermediate carrier body.

In some embodiments, the first intermediate carrier body may be shaped to include a flange that extends circumferentially from the adjacent circumferential end of the first intermediate carrier body to form the groove. The flange of the first intermediate carrier body may extend into a groove formed by the flange of the second intermediate carrier body to engage the flange of the second intermediate carrier body.

In some embodiments, the flange of the second intermediate carrier body may axially overlap the flange of the first intermediate carrier body. The flanges may axially overlap so that the one pin of the at least two first intermediate carrier pins extends axially through the flange of the first intermediate carrier body and the flange of the second intermediate carrier body to form the joint.

According to another aspect of the present disclosure, a turbine shroud adapted for use in a gas turbine engine may include a first turbine shroud segment and a second turbine shroud segment. The second turbine shroud segment may be arranged circumferentially adjacent to the first turbine shroud segment.

In some embodiments, the first turbine shroud segment may include a first carrier, a first blade track segment, and a first intermediate carrier configured to couple the first blade track segment to the first carrier. In some embodiments, the first blade track segment may be formed to include a first runner and a first attachment portion. The first runner may be shaped to extend circumferentially partway around a center axis of the gas turbine engine. The first attachment portion may extend radially outward from the first runner.

In some embodiments, the first intermediate carrier may include a first intermediate carrier body and a first intermediate carrier pin. The first intermediate carrier body may be arranged adjacent to the first attachment portion. The first intermediate carrier pin may extend axially through the first attachment portion and the first intermediate carrier body to couple the first intermediate carrier body to the first blade track segment.

In some embodiments, the second turbine shroud segment may include a second carrier, a second blade track segment, and a second intermediate carrier configured to couple the second blade track segment to the second carrier. The second blade track segment may be formed to include a second runner and a second attachment portion. The second runner may be shaped to extend circumferentially partway around the center axis. The second attachment portion may extend radially outward from the second runner.

In some embodiments, the second intermediate carrier may include a second intermediate carrier body and a second intermediate carrier pin. The second intermediate carrier body may be arranged adjacent to the second attachment portion. The second intermediate carrier pin may extend axially through the second attachment portion and the second intermediate carrier body to couple the second intermediate carrier body to the second blade track segment.

In some embodiments, the second intermediate carrier body may be shaped to define a flange. The flange may extend circumferentially from a circumferential end of the second intermediate carrier body into a groove formed in an adjacent circumferential end of the first intermediate carrier body. The flange may extend into the groove so that the first intermediate carrier pin extends axially through the first intermediate carrier body and the flange of the second intermediate carrier body to form a joint between the first intermediate carrier and the second intermediate carrier.

In some embodiments, the first intermediate carrier may further include a plurality of first intermediate carrier retainers. The plurality of first intermediate carrier retainers may each extend radially and couple the first intermediate carrier body with the carrier.

In some embodiments, the second intermediate carrier may further includes a plurality of second intermediate carrier retainers. The plurality of second intermediate carrier retains may each extend radially and couple the second intermediate carrier body with the carrier.

In some embodiments, the second intermediate carrier body may be shaped to include a forward side surface and an aft side surface. The aft side surface may be spaced apart axially from the forward side surface.

In some embodiments, the circumferential end may extend between and interconnect the forward side surface and the aft side surface. Edges of the flange may be spaced apart axially from the forward side surface and the aft side surface of the second intermediate carrier body. In some embodiments, edges of the flange of the second intermediate carrier may be spaced apart axially from edges of the circumferential end of the second intermediate carrier body.

In some embodiments, the first intermediate carrier body may be shaped to include a flange. The flange may extend circumferentially from the adjacent circumferential end of the first intermediate carrier body to form the groove. The flange of the first intermediate carrier body may extend into a groove formed by the flange of the second intermediate carrier body to engage the flange of the second intermediate carrier body.

In some embodiments, the flange of the second intermediate carrier body may axially overlap the flange of the first intermediate carrier body. The flanges may axially overlap such that the one pin of the at least two first intermediate carrier pins extends axially through the flange of the first intermediate carrier body and the flange of the second intermediate carrier body to form the joint.

In some embodiments, the first intermediate carrier body may be shaped to include a flange. The flange may extend circumferentially from the adjacent circumferential end of the first intermediate carrier body to form the groove. The flange of the first intermediate carrier body may extend into a groove formed by the flange of the second intermediate carrier body to engage the flange of the second intermediate carrier body. One pin of the two first intermediate carrier pins may extend axially through the flange of the first intermediate carrier body and the flange of the second intermediate carrier body to form the joint.

According to another aspect of the present disclosure, a method may include providing a plurality of blade track segments, a plurality of intermediate carrier bodies, and a plurality of intermediate carrier pins. Each blade track segment may include a runner, a fore mount post, and an aft mount post. The runner may be shaped to extend partway around an axis. The fore mount post may extend radially outward from the first runner. The aft mount post may be spaced apart axially from the fore mount post that extends radially outward from the runner.

In some embodiments, the method may further include arranging a first intermediate carrier body of the plurality of intermediate carrier bodies axially between the fore mount post and the aft mount post of a first blade track segment included in the plurality of blade track segments. In some embodiments, the method may further include inserting the one pin of the plurality of intermediate carrier pins axially through the fore mount post, the first intermediate carrier body, and the aft mount post to couple the first blade track segment to the first intermediate carrier body.

In some embodiments, the method may further include arranging a second intermediate carrier body circumferentially adjacent to the first intermediate carrier body so that a flange formed by the second intermediate carrier body extends into a groove formed in the first intermediate carrier body. In some embodiments, the method may further include inserting another pin of the plurality of intermediate carrier pins axially through the fore mount post, the first intermediate carrier body, the flange of the second intermediate carrier body, and the aft mount post to couple the first blade track segment to the first intermediate carrier body and the second intermediate carrier body.

In some embodiments, the method may further include repeating the previous steps until the assembled plurality of blade track segments and plurality of intermediate carrier bodies form a full hoop turbine shroud. In some embodiments, the method may further include arranging the full hoop turbine shroud in a gas turbine engine.

In some embodiments, each of the plurality of intermediate carrier body may be shaped to form at least two intermediate carrier retainers. The intermediate carrier retainers may each extend radially from the intermediate carrier body.

In some embodiments, the step of arranging the full hoop turbine shroud in the gas turbine engine may include aligning the at least two intermediate carrier retainers of each intermediate carrier body of the plurality of intermediate carrier bodies with corresponding holes. The step of arranging the full hoop turbine shroud in the gas turbine engine may also include coupling two intermediate carrier retainers of each intermediate carrier body of the plurality of intermediate carrier bodies with a carrier included in the gas turbine engine.

In some embodiments, edges of the flange included in each intermediate carrier body of the plurality of intermediate carrier bodies may be spaced apart axially from edges of a circumferential end of the intermediate carrier body. In some embodiments, the first intermediate carrier body may be shaped to include a flange that extends circumferentially from the adjacent circumferential end of the first intermediate carrier body to form the groove.

In some embodiments, the flange of the first intermediate carrier body may extend into a groove formed by the flange of the second intermediate carrier body to engage the flange of the second intermediate carrier body. The one pin of the at least two first intermediate carrier pins may extend axially through the flange of the first intermediate carrier body and the flange of the second intermediate carrier body to form the joint.

These and other features of the present disclosure will become more apparent from the following description of the illustrative embodiments.

DETAILED DESCRIPTION OF THE DRAWINGS

Figure 1:
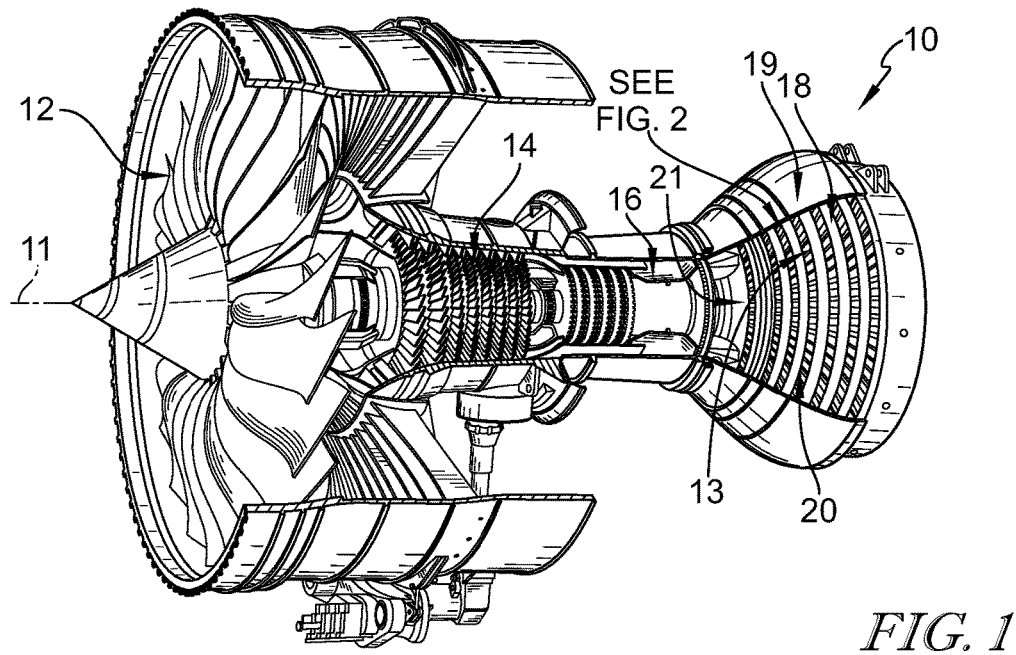
FIG. 1 is a cut-away perspective view of a gas turbine engine showing that the exemplary engine includes a fan, a compressor, a combustor, and a turbine and suggesting that the turbine includes static vane assemblies and turbine wheel assemblies surrounded by a turbine shroud.

For the purposes of promoting an understanding of the principles of the disclosure, reference will now be made to a number of illustrative embodiments illustrated in the drawings and specific language will be used to describe the same.

Figure 2:
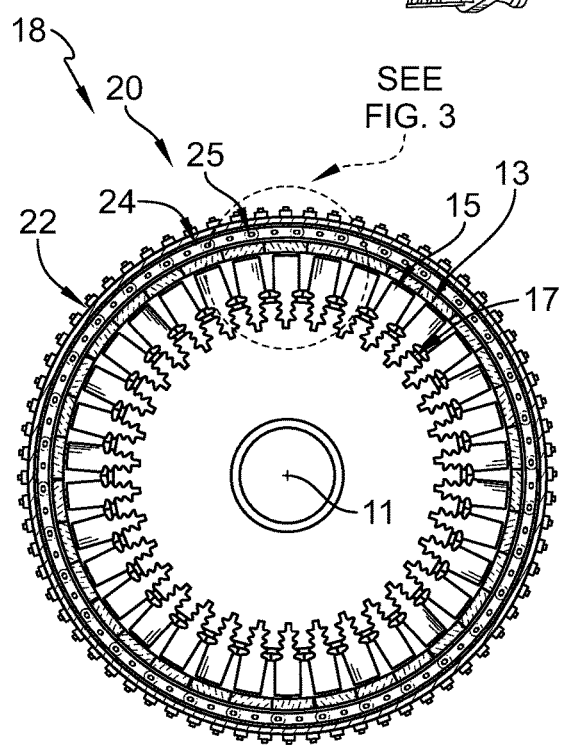
FIG. 2 is a front elevation view of a turbine wheel assembly with the surrounding turbine shroud included in the turbine of the gas turbine engine of FIG. 1 showing that the turbine shroud comprise a plurality of turbine shroud segments that form a full hoop that extends around the turbine blades included in the turbine wheel assembly to resist combustion products from passing over the blades without interacting with the turbine blades.

A turbine shroud 20 adapted for use in a gas turbine engine 10 is shown in FIGS. 2-8. The turbine shroud 20 is made up of a carrier 22 and a number of shroud segments 24, 25 that each extend only partway around a central axis 11 of the gas turbine engine 10. The carrier 22 is a metallic support component configured to interface with other metallic components of the gas turbine engine 10. Each of the shroud segments 24, 25 cooperate to surround a turbine wheel assembly 13 of a turbine section 18 included in the gas turbine engine 10 as shown in FIGS. 1 and 2. The turbine shroud 20 extends around the turbine wheel assembly 13 to block combustion products from passing over the blades 15 without pushing the blades 15 to rotate as suggested in FIGS. 2 and 7.

Figure 3:
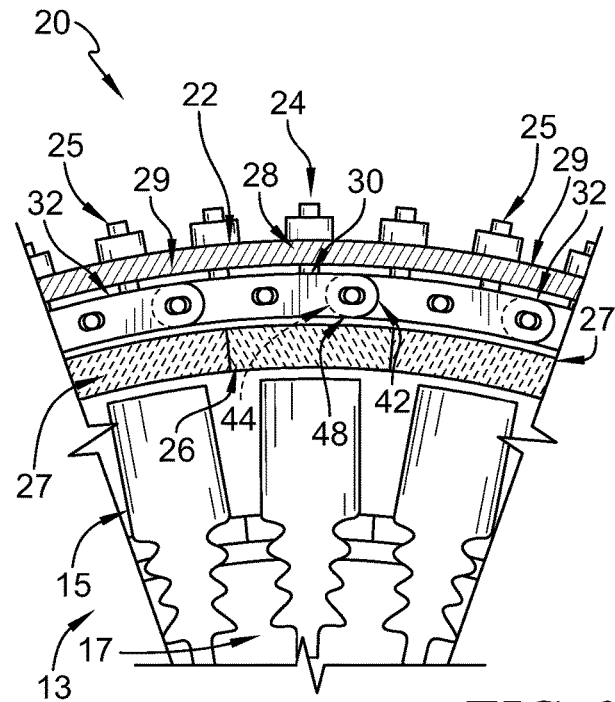
FIG. 3 is a detail view of the turbine shroud of FIG. 2 showing each turbine shroud segment of the turbine shroud includes a blade track segment comprising ceramic matrix composite materials and an intermediate carrier configured to couple the blade track segment to a carrier, and showing the intermediate carriers of each turbine shroud segment each include an intermediate carrier body that extends circumferentially partway about the axis and a flange that extends circumferentially from the intermediate carrier body and engages the adjacent intermediate carrier body to form a joint between adjacent turbine shroud segments that closes a gap between segments while allowing for relative movement between the segments.
Figure 4:
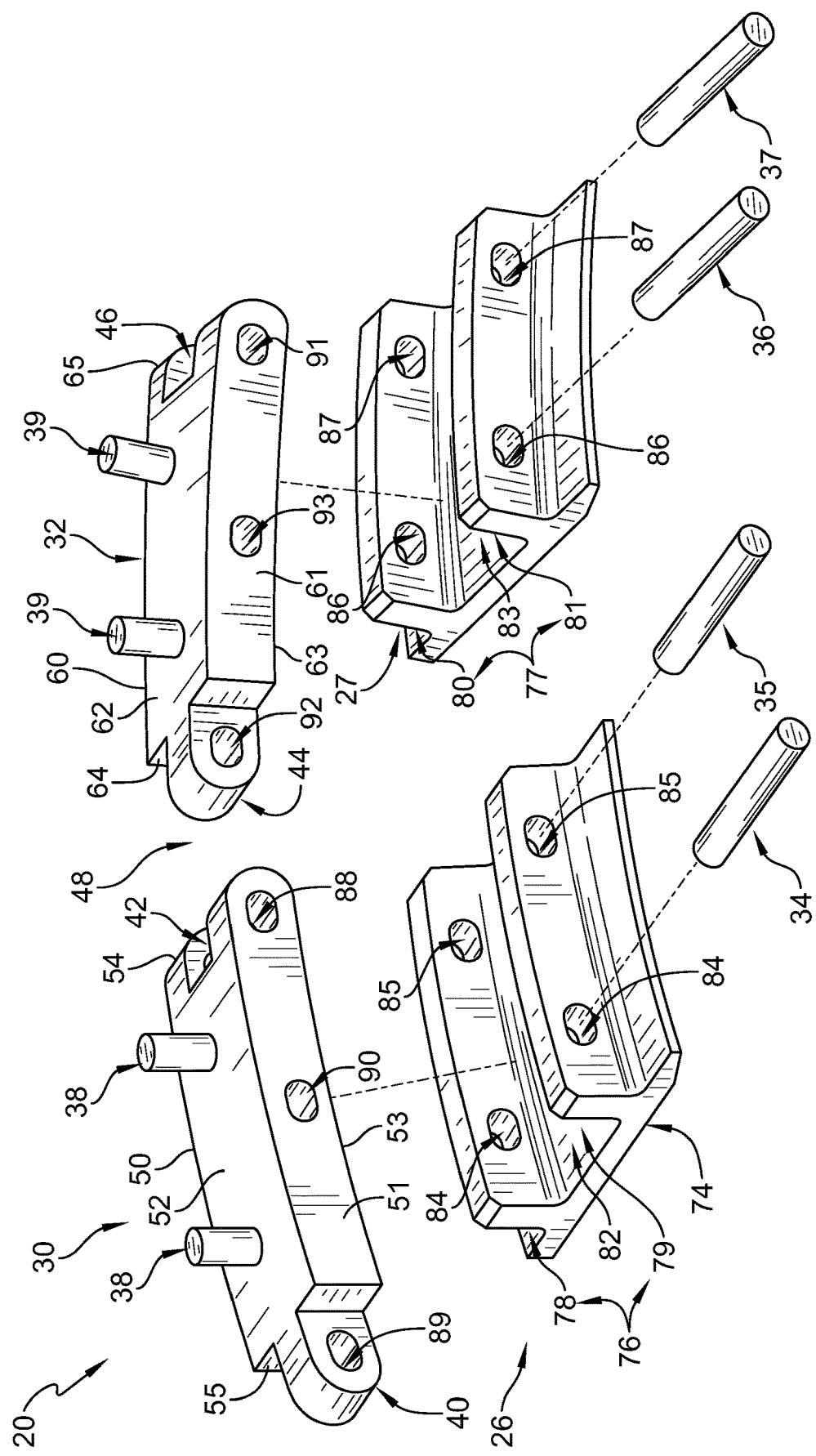
FIG. 4 is an exploded view of a portion of the turbine shroud of FIG. 3 showing the intermediate carrier of each turbine shroud segment is configured to be arranged in a channel formed in an attachment portion of each blade track segment.
Figure 5:
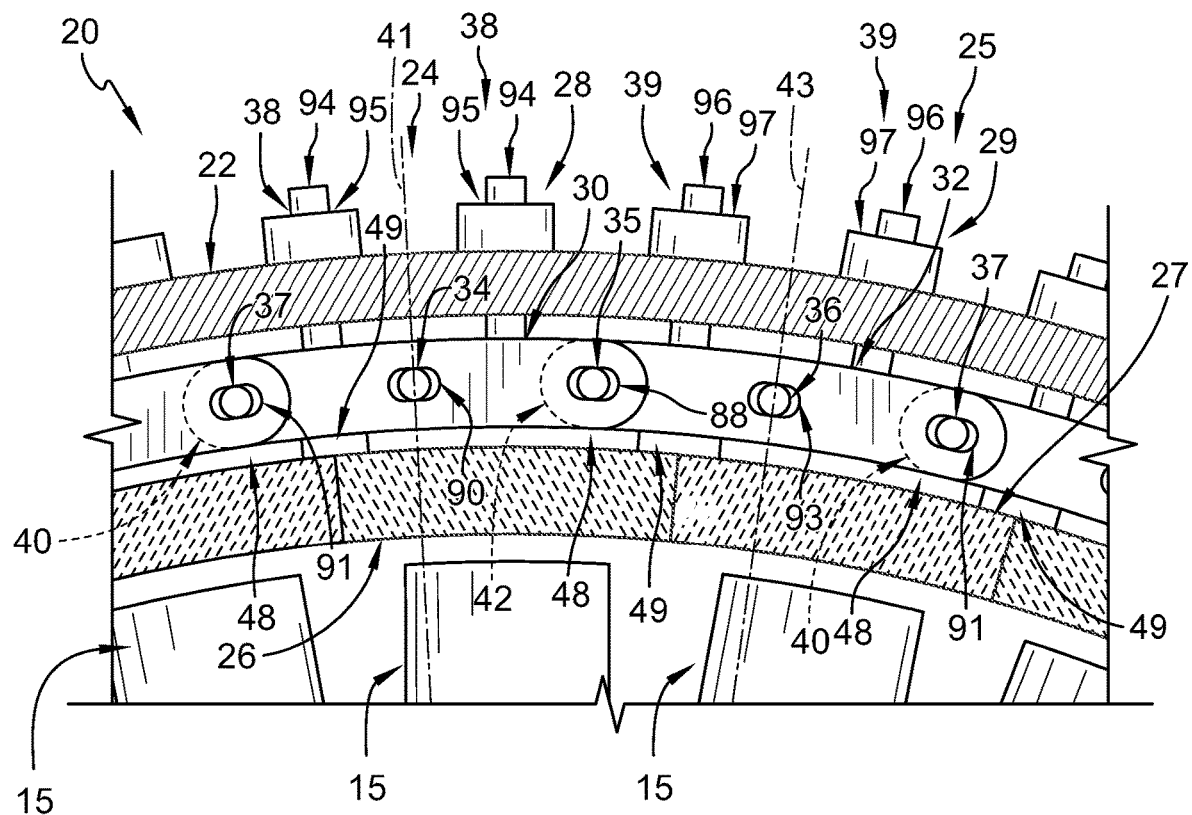
FIG. 5 is a detail view similar to FIG. 3 showing the intermediate carrier of each turbine shroud segment further includes pins that couple the intermediate carrier body to the blade track segment and retainers that each extend radially from the intermediate carrier body and couple the intermediate carrier body with the carrier.

The second shroud segments 25 are spaced circumferentially adjacent to the first shroud segments 24 in the illustrative embodiments. Each of the first and second turbine shroud segments 24, 25 includes a blade track segment 26, 27 and an intermediate carrier 28, 29 configured to couple the blade track segment 26, 27 to the carrier 22 as shown in FIGS. 3-5. The blade track segments 26, 27 are ceramic matrix composite components configured to directly face the high temperatures of a gas path 21 of the gas turbine engine 10. The intermediate carrier 28, 29 is designed to engage the corresponding blade track segment 26, 27 so as to couple the blade track segment 26, 27 to the carrier 22 and distribute mounting of the blade track segment 26, 27 to the carrier 22.

Each intermediate carrier 28, 29 of the first and second shroud segments 24, 25 includes an intermediate carrier body 30, 32, illustratively two pins 34, 35, 36, 37 and a plurality of retainers 38, 39 as shown in FIGS. 4-6 and 8. The intermediate carrier body 30, 32 is arranged adjacent to an attachment portion 76 of the corresponding blade track segment 26, 27. The pins 34, 35, 36, 37 extend axially through the attachment portion 76, 77 of the blade track segment 26, 27 and the intermediate carrier body 30, 32 to couple the blade track segment 26, 27 to the intermediate carrier body 30, 32. Each of the retainers 38, 39 extends outward from the corresponding intermediate carrier body 30, 32 to the carrier 22 and engages the carrier 22 to couple the intermediate carrier 28, 29 to the carrier 22.

The second intermediate carrier body 32 is shaped to define a flange 44 that mates with a groove 42 formed in the first intermediate carrier body 30 as shown in FIGS. 3-6. The flange 44 extends circumferentially from a circumferential end 64 of the second intermediate carrier body 32 into the groove 42 formed in an adjacent circumferential end 54 of the first intermediate carrier body 30. In this way, one pin 35 of the first intermediate carrier pins 34, 35 extends axially through the first intermediate carrier body 30 and the flange 44 of the second intermediate carrier body 32 to form a joint 48 between the first intermediate carrier 28 and the second intermediate carrier 29.

The joint 48 couples the first intermediate carrier 28 to the second intermediate carrier 29 to share loading therebetween, while also closing a gap 49 between the first turbine shroud segment 24 and the second turbine shroud segment 25 as shown in FIG. 5. In the illustrative embodiment, the joint 48 is a clevis joint 48 allowing relative movement between the intermediate carriers 28, 29 during assembly of the turbine shroud segments 24, 25 and/or operation of the gas turbine engine 10.

In an event one of the turbine blades 15 detaches from the rotor disk 17, the joint 48 between the first intermediate carrier 28 and the second intermediate carrier 29 prevents the through blade 15 from bypassing the intermediate carriers 28, 29 prior to contacting a portion of the carrier 22. The joint 48 closes the gap 49 between the intermediate carriers 28, 29 so that the detached blade 15 contacts the intermediate carrier bodies 30, 32 reducing the energy in the blade 15 and helping contain the blade 15 in the engine 10.

Further, by interlocking the intermediate carriers 28, 29, the intermediate carriers 28, 29 may share the loading of one of the blade track segments 26, 27. As such, the number of retainers 38, 39 for each of the intermediate carriers 28, 29 may be reduced, which may reduce the weight of each of the turbine shroud segments 24, 25 and/or the overall turbine shroud 20.

In the illustrative embodiment, the first intermediate carrier 28 of the first shroud segment 24 includes the first intermediate carrier body 30, the first intermediate carrier pins 34, 35, and the first retainers 38 as shown in FIGS. 3-6 and 8. The first intermediate carrier body 30 is arranged adjacent to the attachment portion 76 of the first blade track segment 26. The first intermediate carrier pins 34, 35 extend axially through the attachment portion 76 of the first blade track segment 26 and first the intermediate carrier body 30 to couple the first blade track segment 26 to the first intermediate carrier body 30. Each of the first retainers 38 extends outward from the first intermediate carrier body 30 to the carrier 22 and engages the carrier 22 to couple the first intermediate carrier 28 to the carrier 22.

Figure 6:
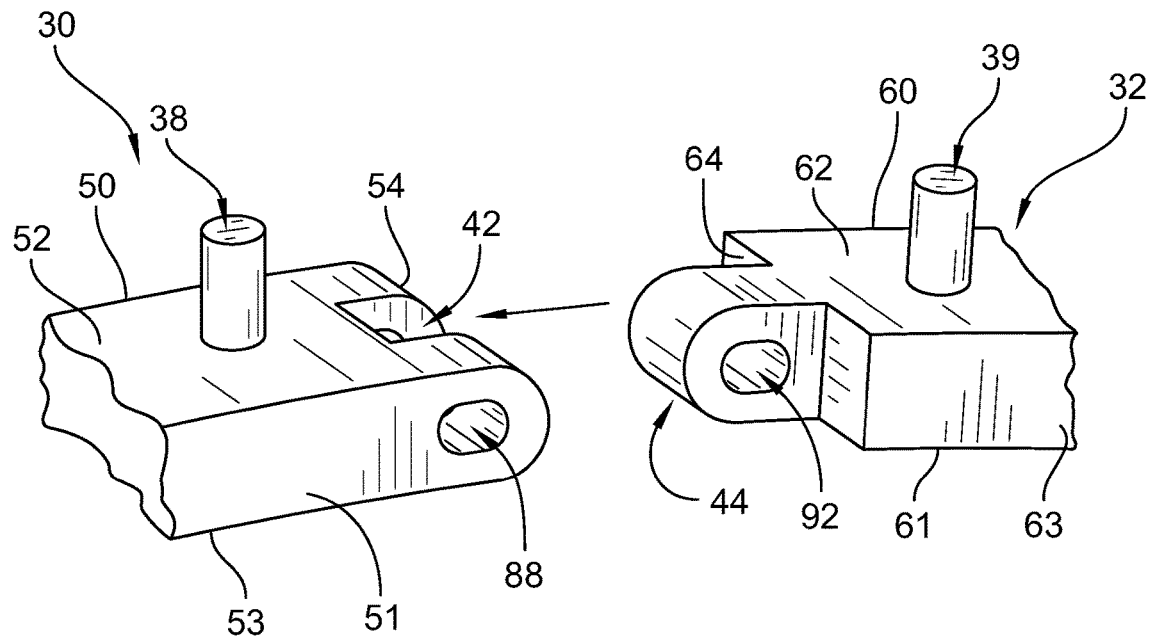
FIG. 6 is detail exploded view of the joint between the adjacent turbine shroud segments of FIG. 4 showing the flange of the second intermediate carrier body mates with a groove formed in the first intermediate carrier body of the adjacent turbine shroud segment.

The first intermediate carrier body 30 is shaped to include forward and aft side surfaces 50, 51, outer and inner radial surface 52, 53, and circumferential ends 54, 55 as shown in FIGS. 4 and 6. The aft side surface 51 is spaced apart axially from the forward side surface 50, while the inner radial surface 53 is spaced apart radially from the outer radial surface 52. The forward and aft side surfaces 50, 51 extend between and interconnect the outer radial surface 52 and the inner radial surface 53. The circumferential ends 54, 55 are spaced apart circumferentially from each other and each extend between and interconnect the forward side surface 50 and the aft side surface 51.

In the illustrative embodiment, one circumferential end 54 is shaped to include the groove 42, while the other circumferential end 55 is shaped to include a flange 40 as shown in FIG. 4. The flange 40 extends circumferentially from the circumferential end 55 of the first intermediate carrier body 30 and engages a groove 46 formed in another intermediate carrier body 32 of an adjacent turbine shroud segment 25 opposite the second turbine shroud segment 25. Edges of the flange 40 are spaced apart axially from the forward side surface 50 and the aft side surface 51 of the first intermediate carrier body 30 in the illustrative embodiment.

The second intermediate carrier 29 of the second shroud segment 25 includes the second intermediate carrier body 32, the second intermediate carrier pins 36, 37, and the second retainers 39 as shown in FIGS. 3-6. The second intermediate carrier body 32 is arranged adjacent to the attachment portion 77 of the second blade track segment 27. The second intermediate carrier pins 36, 37 extend axially through the attachment portion 77 of the second blade track segment 27 and second the intermediate carrier body 32 to couple the second blade track segment 27 to the second intermediate carrier body 32. Each of the second retainers 39 extends outward from the second intermediate carrier body 32 to the carrier 22 and engages the carrier 22 to couple the second intermediate carrier 29 to the carrier 22 adjacent the first turbine shroud segment 24.

The second intermediate carrier body 32 is shaped to include forward and aft side surfaces 60, 61, outer and inner radial surface 62, 63, and circumferential ends 64, 65 as shown in FIGS. 4 and 6. The aft side surface 61 is spaced apart axially from the forward side surface 60, while the inner radial surface 63 is spaced apart radially from the outer radial surface 62. The forward and aft side surfaces 60, 61 extend between and interconnect the outer radial surface 62 and the inner radial surface 63. The circumferential ends 64, 65 are spaced apart circumferentially from each other and each extend between and interconnect the forward side surface 60 and the aft side surface 61.

In the illustrative embodiment, one circumferential end 64 is shaped to include the flange 44, while the other circumferential end 65 is shaped to include a groove 46 as shown in FIG. 4. The groove 46 formed in the circumferential end 65 is configured to receive a flange 40 of another intermediate carrier body 30 of an adjacent turbine shroud segment 24 opposite the first turbine shroud segment 24. Edges of the flange 44 are spaced apart axially from the forward side surface 60 and the aft side surface 61 of the second intermediate carrier body 32 in the illustrative embodiment.

Turning again to the gas turbine engine 10, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

The turbine 18 includes at least one turbine wheel assembly 13 and the turbine shroud 20 positioned to surround the turbine wheel assembly 13 as shown in FIGS. 1-3 and 7-8. The turbine shroud 20 is coupled to a case 19 of the gas turbine engine 10. The turbine wheel assembly 13 includes the plurality of blades 15 coupled to a rotor disk 17 for rotation therewith. The hot, high pressure combustion products from the combustor 16 are directed toward the blades 15 of the turbine wheel assembly 13 along the gas path 21. The blades 15 are in turn pushed by the combustion products to cause the turbine wheel assembly 13 to rotate; thereby, driving the rotating components of the compressor 14 and/or the fan 12.

Figure 7:
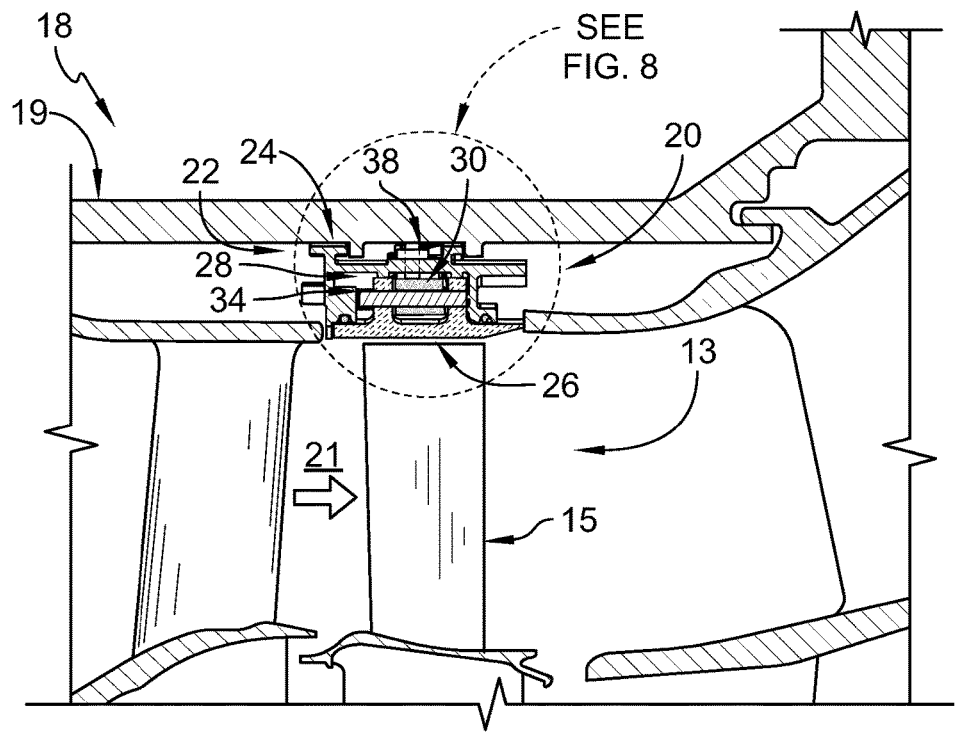
FIG. 7 is a partial cross-sectional view of the gas turbine engine of FIG. 1 showing a portion of the turbine in which the turbine shroud is located radially outward from blades of the turbine wheel assembly to block gasses from passing over the blades without interacting with the blades.

The turbine shroud 20 extends around the turbine wheel assembly 13 to block combustion products from passing over the blades 15 without pushing the blades 15 to rotate as suggested in FIGS. 2 and 7. In the illustrative embodiment, the turbine shroud 20 is made up of a number of shroud segments 24, 25. In other embodiments, certain components of the turbine shroud 20 are segmented while other components are annular and non-segmented.

The carrier 22 included the turbine shroud 20 is coupled to the case 19 of the engine 10 as shown in FIG. 7. In the illustrative embodiment, the carrier 22 is a full hoop and extends about the axis 11, while in other embodiments; the carrier 22 may be segmented. In such embodiments, each turbine shroud segment 24, 25 may include a carrier segment 22.

Figure 8:
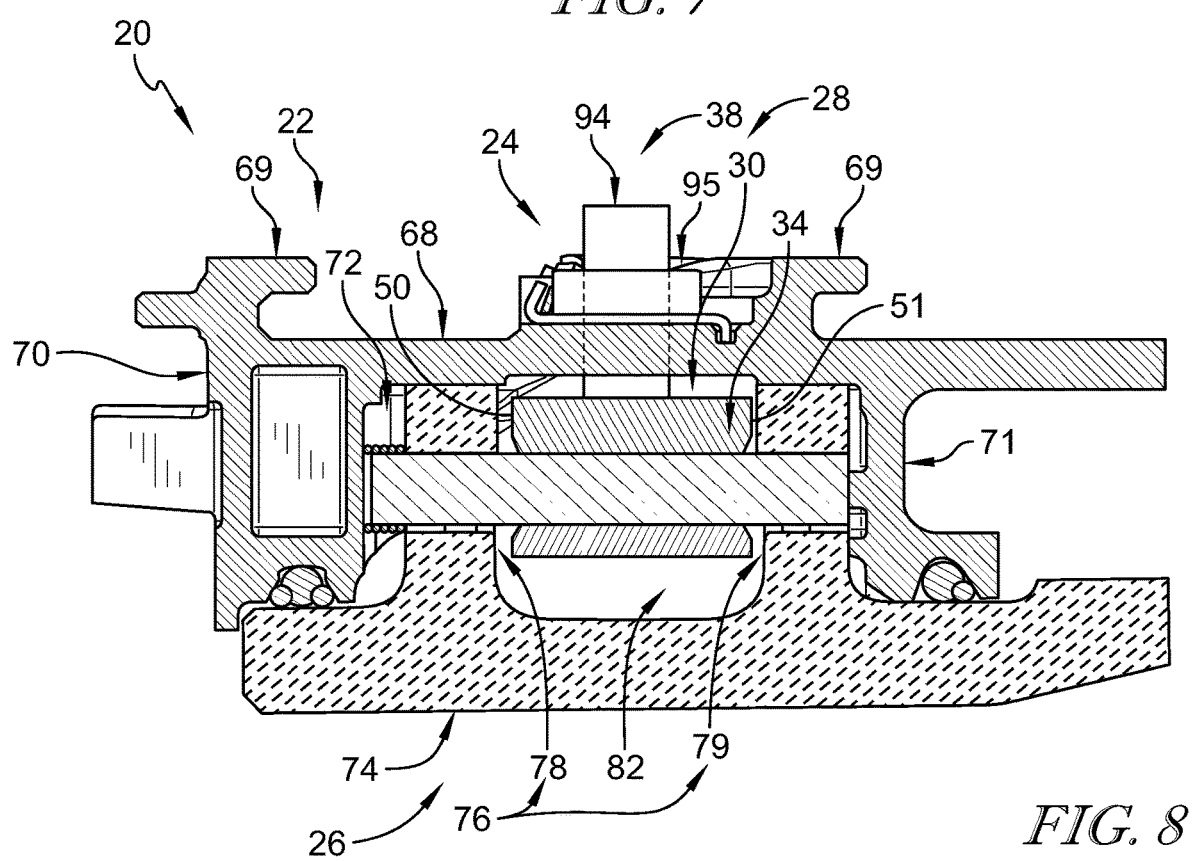
FIG. 8 is a detail view of FIG. 7 showing each blade track segment includes a runner that faces the gas path of the gas turbine engine, a fore mount post that extends radially outward from the runner, and an aft mount post that extends radially outward from the runner and spaced apart axially from the first fore mount post to define the channel therebetween, and further the pins included in the intermediate carrier extend axially into the fore mount post, the intermediate carrier body, and the aft mount post.

The carrier 22 includes an outer wall 68, hangers 69, and fore and aft walls 70, 71 as shown in FIG. 8. The outer wall 68 extends circumferentially partway about the axis 11 and is shaped to include through holes that receive a portion of the retainers 38, 39. The hangers 69 extend radially outward from the outer wall 68 and engage the case 19 to couple the turbine shroud segment 24, 25 to the rest of the engine 10. Each of the fore and aft walls 70, 71 extend radially inward from the outer wall 68 on opposite axial ends of the outer wall 68. The aft wall 71 is spaced apart axially from the fore wall 70 to define the attachment-receiving space 72 therebetween that receives the attachment portion 76, 77 of the blade track segment 26, 27.

The blade track segment 26, 27 of each shroud segment 24, 25 comprises ceramic matrix composite materials as suggested in FIGS. 2-4 and 7-8. The blade track segment 26, 27 is held in place adjacent to tips of blades 15 to block combustion products from passing over the blades 15 without pushing the blades 15 to rotate.

Each of the blade track segments 26, 27 is illustratively formed to include a runner 74, 75 and the attachment portion 76, 77 as shown in FIGS. 4 and 8. Each runner 74, 75 is arcuate and extends partway around axis 11 adjacent to blades 15. Each runner 74, 75 defines a flow path surface that faces the gas path 21 of the gas turbine engine 10 and the backside surface that faces radially outward toward the carrier 22. Each attachment portion 76, 77 extends radially outward from the backside surface of the corresponding runner 74, 75 to provide structure for coupling the blade track segment 26, 27 to the carrier 22.

In the illustrative embodiment, each attachment portion 76, 77 includes a fore mount post 78, 79 and an aft mount post 80, 81 as shown in FIGS. 4 and 8. Each mount post 78, 79, 80, 81 extends radially outward from the corresponding runner 74, 75. The aft mount post 80, 81 is spaced apart axially from the fore mount post 78, 79 to define a channel 82, 83 therebetween. In other embodiments, the attachment portion 76, 77 may be provided by L-shaped hangers, fir-tree shaped members, dovetail members, box shape panels, or other suitable features.

The first blade track segment 26 includes the runner 74, the first fore mount post 78, and the first aft mount post 79 as shown in FIGS. 4 and 8. The first intermediate carrier body 30 is arranged in the first channel 82 axially between the first fore mount post 78 and the first aft mount post 79. Each of the pins 34, 35 extends axially through the first fore mount post 78, the intermediate carrier body 30, and the first aft mount post 79. The pin 35 extends through the first fore mount post 78, the first intermediate carrier body 30, the flange 44 of the second intermediate carrier body 32, and the first aft mount post 79.

The first intermediate carrier body 30 is shaped to include pin holes 88, 89, 90 as shown in FIGS. 4-6. The pin holes 88, 89, 90 are spaced apart circumferentially apart along the first intermediate carrier body 30. The first pin hole 88 extends axially through the intermediate carrier body 30 and opens into the groove 42. The second pin hole 89 extends axially through the flange 40 of the first intermediate carrier body 30. The third pin hole 90 extends through the first intermediate carrier body 30 circumferentially between the first and second pin holes 88, 89.

In the illustrative embodiment, each of the first mount posts 78, 79 are also shaped to include corresponding pin holes 84, 85 as shown in FIG. 4. The pin holes 84, 85 are each axially aligned with the pin holes 88, 90 of the first intermediate carrier body 30. One pin 34 extends axially through the pin hole 84 formed in the first fore mount post 78, the pin hole 90 of the intermediate carrier body 30, and the pin hole 84 formed in the first aft mount post 79 to couple the blade track segment 26 to the intermediate carrier body 30. The other pin 35 extends axially through the pin hole 85 formed in the first fore mount post 78, the pin hole 88 of the intermediate carrier body 30, a pin hole 92 formed in the flange 44 of the second intermediate carrier body 32, and the pin hole 85 formed in the first aft mount post 79 to couple the blade track segment 26 to the intermediate carrier body 30.

Each of the first retainers 38 each include a stud 94 and a fastener 95 as shown in FIGS. 5 and 8. The stud 94 is integrally formed with the intermediate carrier body 30 and extends radially outward from the intermediate carrier body 30 through the carrier 22. The fastener 95 has threads that mate with corresponding threads formed in the stud 94 radially outward of the carrier 22. The fasteners 95 mate with the studs 94 to couple the intermediate carrier 28 with the assembled blade track segment 26 to the carrier 22. The fasteners 95 may be tightened to bring the radially-outwardly facing surface of the fore and aft mount posts 78, 79 into contact with the locating pads formed in the carrier 22.

In the illustrative embodiment, the intermediate carrier body 30 includes at least two retainers 38 as shown in FIGS. 3-5. The retainers 38 are located at opposite circumferential ends 54, 55 of the intermediate carrier body 30. The retainers 38 extends outward parallel to a radial axis 41 that extends radially relative to the central axis 11 at a center of the intermediate carrier body 30.

The second blade track segment 27 includes the runner 75, the second fore mount post 80, and the second aft mount post 81 as shown in FIG. 4. The second intermediate carrier body 32 is arranged in the second channel 83 axially between the second fore mount post 80 and the second aft mount post 81. Each of the pins 36, 37 extends axially through the second fore mount post 80, the intermediate carrier body 32, and the second aft mount post 81. The pin 37 extends through the second fore mount post 80, the second intermediate carrier body 32, the flange 40 of the adjacent intermediate carrier body 30, and the second aft mount post 81.

The second intermediate carrier body 32 is shaped to include pin holes 91, 92, 93 as shown in FIGS. 4-6. The pin holes 91, 92, 93 are spaced apart circumferentially apart along the second intermediate carrier body 32. The first pin hole 91 extends axially through the intermediate carrier body 32 and opens into the groove 46. The second pin hole 92 extends axially through the flange 40 of the second intermediate carrier body 32. The third pin hole 93 extends through the second intermediate carrier body 32 circumferentially between the first and second pin holes 91, 93.

In the illustrative embodiment, each of the second mount posts 80, 81 are also shaped to include corresponding pin holes 86, 87 as shown in FIG. 4. The pin holes 86, 87 are each axially aligned with the pin holes 91, 93 of the second intermediate carrier body 32. One pin 36 extends axially through the pin hole 86 formed in the second fore mount post 80, the pin hole 93 of the intermediate carrier body 30, and the pin hole 87 formed in the second aft mount post 81 to couple the blade track segment 27 to the intermediate carrier body 32. The other pin 37 extends axially through the pin hole 86 formed in the second fore mount post 80, the pin hole 93 of the intermediate carrier body 32, a pin hole 89 formed in the flange 40 of the first intermediate carrier body 30, and the pin hole 87 of the second aft mount post 81 to couple the blade track segment 27 to the intermediate carrier body 32.

Each of the second retainers 39 each include a stud 96 and a fastener 97 as shown in FIG. 5. The stud 96 is integrally formed with the intermediate carrier body 32 and extends radially outward from the intermediate carrier body 32 through the carrier 22. The fastener 97 has threads that mate with corresponding threads formed in the stud 96 radially outward of the carrier 22. The fasteners 97 mate with the studs 96 to couple the intermediate carrier 28 with the assembled blade track segment 26 to the carrier 22. The fasteners 97 may be tightened to bring the radially-outwardly facing surface of the mount posts 80, 81 into contact with the locating pads formed in the carrier 22.

In the illustrative embodiment, the intermediate carrier body 32 includes at least two retainers 39 as shown in FIGS. 3-5. The retainers 39 are located at opposite circumferential ends 64, 65 of the intermediate carrier body 32. The retainers 39 extends outward parallel to a radial axis 43 that extends radially relative to the central axis 11 at a center of the intermediate carrier body 32.

In other embodiments the first and second retainers 38, 39 may include a coupling and a fastener. The coupling may be integrally formed with the intermediate carrier body 30, 32 and extend radially outward from the intermediate carrier body 30, 32. The fastener may be a bolt that extends through the carrier 22 and mates with threads formed in the coupling.

A method of assembling the full hoop turbine shroud 20 may include several steps. To begin assembling the full hoop turbine shroud 20, the first intermediate carrier body 30 is arranged axially between the fore mount post 78 and the aft mount post 79 of the first blade track segment 26. The intermediate carrier body 30 is arranged in the channel 82 so that the pin holes 88, 90 align with the corresponding pin holes 84, 85 formed in the attachment portion 76 of the blade track segment 26. Then one pin 34 is inserted axially through the pin hole 84 in the fore mount post 78, the pin hole 90 of first intermediate carrier body 32, and the pin hole 84 in the aft mount post 79 to couple the first blade track segment 26 to the first intermediate carrier body 30.

Next, the second intermediate carrier body 32 is arranged circumferentially adjacent to the first intermediate carrier body 30 so that the flange 44 formed by the second intermediate carrier body 32 extends into the groove 42 formed in the first intermediate carrier body 30. The pin hole 92 formed in the flange 44 of the second intermediate carrier body 32 is aligned with the pin hole 88 formed in the first intermediate carrier body 30 before the next pin 35 is inserted. The second pin 35 is inserted through the pin hole 85 in the fore mount post 78, the pin hole 88 formed in the first intermediate carrier body 30, the pin hole 92 formed in the flange 44 of the second intermediate carrier body 32, and the pin hole 85 in the aft mount post 79. Once the pin 35 is inserted, the first blade track segment 26 is coupled to the first intermediate carrier body 30 and the second intermediate carrier body 32.

These steps are then repeated for the second blade track segment 27. The blade track segment 27 is arranged around the second intermediate carrier body 32 so that the second intermediate carrier body 32 is arranged in the second channel 83. The pin holes 86, 87 are aligned with the pin holes 91, 93 formed in the second intermediate carrier body 32. Then one pin 36 is inserted axially through the pin hole 86 in the fore mount post 80, the pin hole 93 of second intermediate carrier body 32, and the pin hole 86 in the aft mount post 81 to couple the second blade track segment 27 to the second intermediate carrier body 32.

Next, another intermediate carrier body 30 is arranged circumferentially adjacent to the second intermediate carrier body 32 so that the flange 40 extends into the groove 46 formed in the second intermediate carrier body 32. The pin hole 89 formed in the flange 40 of the newly added intermediate carrier body 30 is aligned with the pin hole 91 formed in the second intermediate carrier body 32 before the next pin 37 is inserted. The pin 37 is then inserted through the pin hole 87 in the fore mount post 80, the pin hole 91 formed in the second intermediate carrier body 32, the pin hole 89 formed in the flange 40 of the newly added intermediate carrier body 30, and the pin hole 87 in the aft mount post 81. Once the pin 37 is inserted, the second blade track segment 27 is coupled to the second intermediate carrier body 32 and adjacent intermediate carrier body 32.

These steps are repeated for the remaining blade track segments 26, 27 and intermediate carrier bodies 30, 32 until the assembled blade track segments 26, 27 and intermediate carrier bodies 30, 32 form the full hoop turbine shroud 20. The full hoop turbine shroud 20 may then be arranged in the gas turbine engine 10.

To arrange the full hoop turbine shroud 20 in the gas turbine engine 10, the retainers 38, 39 of each intermediate carrier body 30, 32 are aligned with corresponding holes in the carrier 22. The retainers 38, 39 of each intermediate carrier body 30, 32 are then coupled with the carrier 22 by fixing the fasteners 95, 97 with the corresponding studs 94, 96 extending through the carrier 22. The carrier 22 may then be arranged in the gas turbine engine 10.

Figure 9:
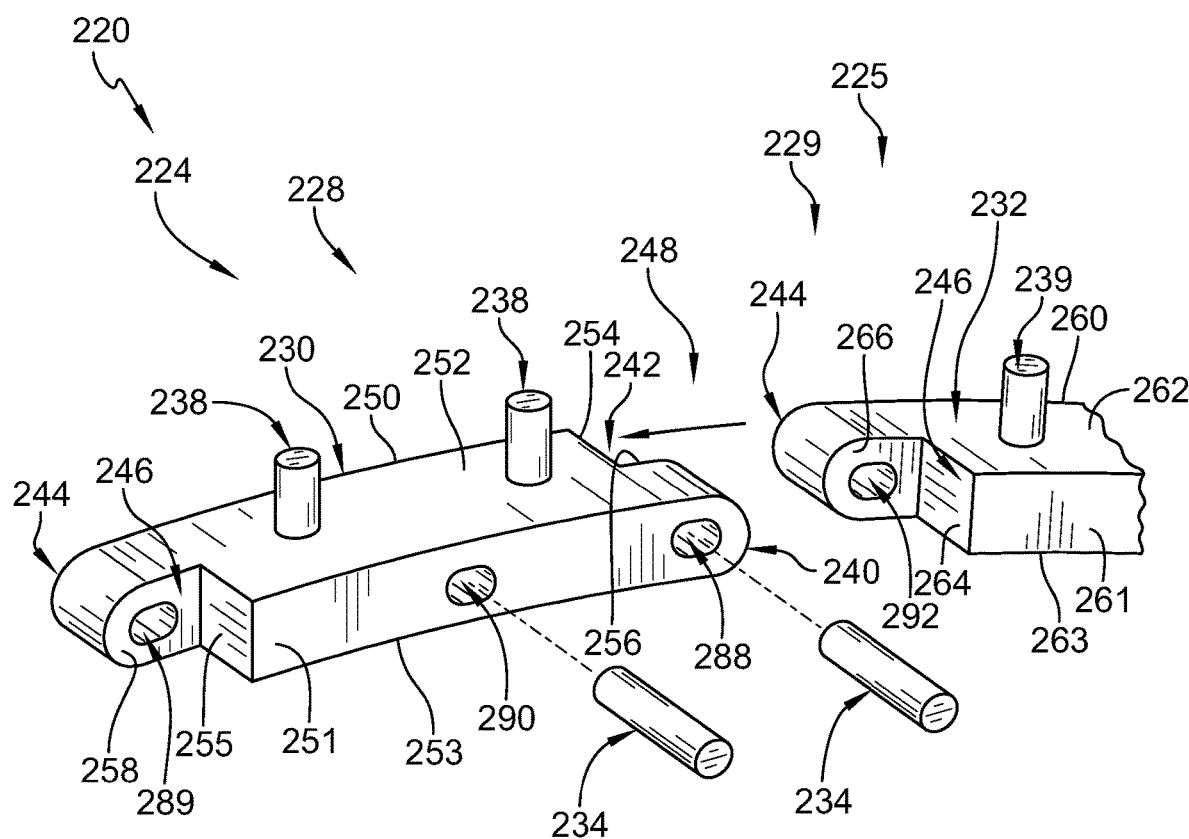
FIG. 9 is an exploded view another embodiment of the joint between intermediate carriers of the adjacent turbine shroud segments of the turbine shroud in the gas turbine engine of FIG. 1 showing a flange of the first intermediate carrier extends circumferentially from the first intermediate carrier body and axially overlaps a flange of the second intermediate carrier body to form the joint therebetween.

Another embodiment of a turbine shroud 220 in accordance with the present disclosure is shown in FIG. 9. The turbine shroud 220 is substantially similar to the turbine shroud 20 shown in FIGS. 1-8 and described herein. Accordingly, similar reference numbers in the 200 series indicate features that are common between the turbine shroud 20 and the turbine shroud 220. The description of the turbine shroud 20 is incorporated by reference to apply to the turbine shroud 220, except in instances when it conflicts with the specific description and the drawings of the turbine shroud 220.

The turbine shroud 220 is made up of a number of shroud segments 224, 225 that each extend only partway around the central axis 11 of the gas turbine engine 10. Each of the first and second turbine shroud segments 224, 225 includes an intermediate carrier 228, 229 as shown in FIG. 9. The intermediate carriers 228, 229 are configured to couple the blade track segments 26, 27 to the carrier 22 like as shown in FIGS. 2-7.

Each intermediate carrier 228, 229 of the first and second shroud segments 224, 225 includes an intermediate carrier body 230, 232, pins 234, 235, and a plurality of retainers 238, 239 as shown in FIG. 9. The pins 234, 235 extend axially through the blade track segment 26, 27 and the intermediate carrier body 230, 232 to couple the blade track segment 26, 27 to the intermediate carrier body 230, 232. Each of the retainers 238, 239 extends outward from the corresponding intermediate carrier body 230, 232.

The second intermediate carrier body 232 is shaped to define a flange 244 and a groove 246 that is configured to mate with a corresponding flange 240 and a groove 242 formed in the first intermediate carrier 230 as shown in FIG. 9. The flange 244 extends circumferentially from a circumferential end 264 of the second intermediate carrier body 232 into the groove 242 formed in an adjacent circumferential end 254 of the first intermediate carrier body 230. The flange 240 extends circumferentially from the adjacent circumferential end 254 of the first intermediate carrier body 230 into the groove 246 formed in the second intermediate carrier body 232.

The flanges 240 engages the flange 244 so that the flange 240 of the first intermediate carrier body 230 axially overlaps the flange 244 of the second intermediate carrier body 232. In this way, one pin 235 of the first intermediate carrier pins 234, 235 extends axially through the flange 240 of the first intermediate carrier body 230 and the flange 244 of the second intermediate carrier body 232 to form a joint 248 between the first intermediate carrier 228 and the second intermediate carrier 229.

The first intermediate carrier 228 of the first shroud segment 224 includes the first intermediate carrier body 230, the first intermediate carrier pins 234, 235, and the first retainers 238 as shown in FIG. 9. The first intermediate carrier body 230 is shaped to include forward and aft side surfaces 250, 251, outer and inner radial surface 252, 253, and circumferential ends 254, 255 as shown in FIG. 9. The aft side surface 251 is spaced apart axially from the forward side surface 250, while the inner radial surface 253 is spaced apart radially from the outer radial surface 252. The forward and aft side surfaces 250, 251 extend between and interconnect the outer radial surface 252 and the inner radial surface 253. The circumferential ends 254, 255 are spaced apart circumferentially from each other and each extend between and interconnect the forward side surface 250 and the aft side surface 251.

The flange 240 of the first intermediate carrier 228 includes a forward facing surface 256 and an aft facing surface 251 as shown in FIG. 9. The forward facing surface 256 is spaced apart axially from the aft facing surface 251. In the illustrative embodiments, the aft facing surface 251 is flush with the aft side surface 251 of the intermediate carrier body 230.

The other flange 244 of the first intermediate carrier 228 includes a forward facing surface 250 and an aft facing surface 258 as shown in FIG. 9. The forward facing surface 250 is spaced apart axially from the aft facing surface 258. In the illustrative embodiments, the forward facing surface 250 is flush with the forward side surface 250 of the intermediate carrier body 230.

The first intermediate carrier body 230 is also shaped to include pin holes 288, 289, 290 as shown in FIG. 9. The pin holes 288, 289, 290 are spaced apart circumferentially apart along the first intermediate carrier body 230. The first pin hole 288 extends axially through the flange 240 of the first intermediate carrier body 230. The second pin hole 289 extends axially through the flange 244 of the first intermediate carrier body 230. The third pin hole 290 extends through the first intermediate carrier body 230 circumferentially between the first and second pin holes 288, 289.

The second intermediate carrier 229 of the second shroud segment 225 includes the second intermediate carrier body 232, the second intermediate carrier pins (not shown), and the second retainers 239 as shown in FIG. 9. The second intermediate carrier body 232 is shaped to include forward and aft side surfaces 260, 261, outer and inner radial surface 262, 263, and the circumferential end 264 as shown in FIG. 9. The aft side surface 261 is spaced apart axially from the forward side surface 260, while the inner radial surface 263 is spaced apart radially from the outer radial surface 262.

The forward and aft side surfaces 260, 261 extend between and interconnect the outer radial surface 262 and the inner radial surface 263. The circumferential end 264 extends between and interconnects the forward side surface 260 and the aft side surface 261.

The flange 244 of the second intermediate carrier 229 includes a forward facing surface 260 and an aft facing surface 266 as shown in FIG. 9. The forward facing surface 260 is spaced apart axially from the aft facing surface 266. The forward facing surface 260 is flush with the forward side surface 260 of the intermediate carrier body 232. In the illustrative embodiment, the forward facing surface 256 of the flange 240 of the first intermediate carrier 228 engages the aft facing surface 266 of the flange 244 of the second intermediate carrier 229.

The second intermediate carrier body 232 is shaped to include the pin hole 292 as shown in FIG. 9. The pin hole 292 extends axially through the flange 244 of the second intermediate carrier body 232.

A method of assembling the turbine shroud 220 includes similar steps of the previous embodiment. When the second turbine shroud segment 225 is arranged circumferentially adjacent to the first turbine shroud segment 224 in the gas turbine engine 10, the second turbine shroud segment 225 is arranged so that the flange 240 of the first intermediate carrier 228 engages the flange 244 of the second intermediate carrier 229 in the corresponding grooves 242, 246. The flanges 240, 244 engage so that the flange 244 of the second intermediate carrier 229 axially overlaps the flange 240 of the first intermediate carrier 228.

The pin 235 is then inserted through the flanges 240, 244 to couple the blade track segment 26 with the first and second intermediate carrier bodies 230, 232. These steps are repeated until the assembled intermediate carriers 228, 229 with the attached blade track segments 26, 27 form the full hoop turbine shroud 220.

The present disclosure relates to an intermediate carrier 28, 29, 228, 229 for attaching and supporting ceramic matrix composite blade track segment 26, 27 in the gas turbine engine 10. In the illustrative embodiments, the blade track segment 26, 27 has a Pi shape.

The intermediate carrier 28, 29 is lengthened to encompass two intermediate carrier pins 34, 35 on one blade track segment 26 and a third pin 37 on an adjacent intermediate carrier 29. One circumferential end 54, 64 of each intermediate carrier 28, 29 forms the male portion, or flange 40, 44, of a clevis joint 48. The flange 40, 44 is shaped to include a pin holes 89, 92.

The opposing circumferential end 55, 65 of each intermediate carrier 28, 29 forms the female portion, or groove 42, 46, of a clevis joint 48. One of the pin holes 88, 91 extends through the intermediate carrier body 30, 32 and opens into the groove 42, 46.

Each intermediate carrier 28, 29 also includes a plurality of radial retention features, or retainers 38, 39. The retainers 38, 39 includes a stud 94, 96 that is parallel to a radial line thru the center of the center pin hole 90, 93.

In other embodiments, the retainers 38, 39 may be threaded bosses. The threaded bosses may be either radial or parallel to a radial line at the center of the center pin hole 90, 93. In the illustrative embodiments, the intermediate carriers 28, 29 each include only two retainers 38, 39. In other embodiments, the intermediate carriers 28, 29 may each include more than two retainers 38, 39.

In the embodiment of FIG. 8, the clevis joint 48 is replaced with a simple overlapping arrangement. The flange 244 of the second intermediate carrier 229 overlaps the flange 240 of the first intermediate carrier 228 and the pin 235 extends through the flanges 240, 244. In this embodiment, the advantage of having two thicker sections, or flanges 240, 244 instead of three thinner or one thick and two thin may be better from a load-carrying standpoint.

Each of the ceramic matrix composite blade track segments 26, 27 includes holes for the intermediate carrier pins 34, 35, 36, 37. To begin putting the turbine shroud 20 together, two intermediate carriers 28, 29, two pins 34, 35, and one blade track segment 26 is provided. Other sealing elements may also be provided.

Starting with the two intermediate carriers 28, 29, the male clevis, or the flange 44 is inserted into the female clevis, or groove 42 such that the pin holes 88, 92 are aligned. The blade track segment 26 is then brought into place around the first intermediate carrier body 30. The blade track segment 26 is arranged such that one pin hole 84 in the blade track segment 26 aligns with the hole 90 in the center of the intermediate carrier body 30 and the other pin hole 85 aligns with the pin hole 88 where the two intermediate carriers 28, 29 form the overlapping clevis 48. The pins 34, 35 are then inserted to secure the blade track segment 26 to the intermediate carrier body 30.

In some embodiments, the tooling in the carrier 22 may be used to keep the pins 34, 35 from falling out. The previous steps are then repeated until a full set of blade track segments 26, 27 and intermediate carriers 28, 29 has been assembled into a hoop continuous turbine shroud ring 20.

By forming a hoop continuous turbine shroud ring 20, the intermediate carriers 28, 29 may help contain the blades 15 in the event of the loss of a turbine blade 15. There may also be a potential reduction in the number of radial retention features 38, 39 relative other designs.

In the illustrative embodiment, only two retention features 38, 39 may be used, where other embodiments may need at least three retainers 38, 39. This may allow for the reduction in the number of bolts, nuts, and/or threaded inserts that are associated with the eliminated retention feature.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud adapted for use in a gas turbine engine, the turbine shroud comprising
  a carrier comprising metallic materials arranged to extend circumferentially at least partway about a center axis,
  a first turbine shroud segment including a first blade track segment comprising ceramic matrix composite materials and a first intermediate carrier configured to couple the first blade track segment to the carrier, the first blade track segment formed to include a first runner shaped to extend circumferentially partway around the center axis, a first fore mount post that extends radially outward from the first runner, and a first aft mount post that extends radially outward from the first runner, the first aft mount post spaced apart axially from the first fore mount post to define a first channel therebetween, and the first intermediate carrier including a first intermediate carrier body arranged in the first channel axially between the first fore mount post and the first aft mount post and at least two first intermediate carrier pins that each extend axially into the first fore mount post, the first intermediate carrier body, and the first aft mount post to couple the first intermediate carrier body to the first blade track segment, and a second turbine shroud segment arranged circumferentially adjacent to the first turbine shroud segment, the second turbine shroud segment including a second blade track segment comprising ceramic matrix composite materials and a second intermediate carrier configured to couple the second blade track segment to the carrier, the second blade track segment formed to include a second runner shaped to extend circumferentially partway around the center axis, a second fore mount post that extends radially outward from the second runner, and a second aft mount post that extends radially outward from the second runner, the second aft mount post spaced apart axially from the second fore mount post to define a second channel therebetween, and the second intermediate carrier including a second intermediate carrier body arranged in the second channel axially between the second fore mount post and the second aft mount post and at least two second intermediate carrier pins that each extend axially into the second fore mount post, the second intermediate carrier body, and the second aft mount post to couple the second intermediate carrier body to the second blade track segment, wherein the second intermediate carrier body is shaped to define a flange that extends circumferentially from a circumferential end of the second intermediate carrier body into a groove formed in an adjacent circumferential end of the first intermediate carrier body so that one pin of the at least two first intermediate carrier pins extends axially through the first intermediate carrier body and the flange of the second intermediate carrier body to form a joint between the first intermediate carrier and the second intermediate carrier that couples the first intermediate carrier to the second intermediate carrier to share loading therebetween and close a gap between the first turbine shroud segment and the second turbine shroud segment.

2. The turbine shroud of claim 1, wherein the first intermediate carrier further includes a plurality of first intermediate carrier retainers that each extend radially and couple the first intermediate carrier body with the carrier, and the second intermediate carrier further includes a plurality of second intermediate carrier retainers that each extend radially and couple the second intermediate carrier body with the carrier.

3. The turbine shroud of claim 2, wherein the plurality of first intermediate carrier retainers includes two first intermediate carrier retainers and the plurality of second intermediate carrier retainers includes two second intermediate carrier retainers.

4. The turbine shroud of claim 2, wherein the second intermediate carrier body is shaped to include a forward side surface and an aft side surface spaced apart axially from the forward side surface, the circumferential end extends between and interconnects the forward side surface and the aft side surface, and edges of the flange are spaced apart axially from the forward side surface and the aft side surface of the second intermediate carrier body.

5. The turbine shroud of claim 2, wherein the first intermediate carrier body is shaped to include a flange that extends circumferentially from the adjacent circumferential end of the first intermediate carrier body to form the groove, the flange of the first intermediate carrier body extends into a groove formed by the flange of the second intermediate carrier body to engage the flange of the second intermediate carrier body, and the one pin of the at least two first intermediate carrier pins extends axially through the flange of the first intermediate carrier body and the flange of the second intermediate carrier body to form the joint.

6. The turbine shroud of claim 5, wherein the flange of the second intermediate carrier body axially overlaps the flange of the first intermediate carrier body.

7. The turbine shroud of claim 1, wherein edges of the flange of the second intermediate carrier are spaced apart axially from edges of the circumferential end of the second intermediate carrier body.

8. The turbine shroud of claim 1, wherein the first intermediate carrier body is shaped to include a flange that extends circumferentially from the adjacent circumferential end of the first intermediate carrier body to form the groove, the flange of the first intermediate carrier body extends into a groove formed by the flange of the second intermediate carrier body to engage the flange of the second intermediate carrier body.

9. The turbine shroud of claim 8, wherein the flange of the second intermediate carrier body axially overlaps the flange of the first intermediate carrier body so that the one pin of the at least two first intermediate carrier pins extends axially through the flange of the first intermediate carrier body and the flange of the second intermediate carrier body to form the joint.

10. A turbine shroud adapted for use in a gas turbine engine, the turbine shroud comprising a first turbine shroud segment including a first carrier, a first blade track segment, and a first intermediate carrier configured to couple the first blade track segment to the first carrier, the first blade track segment formed to include a first runner shaped to extend circumferentially partway around a center axis of the gas turbine engine and a first attachment portion that extends radially outward from the first runner, and the first intermediate carrier includes a first intermediate carrier body arranged adjacent to the first attachment portion and a first intermediate carrier pin that extends axially through the first attachment portion and the first intermediate carrier body to couple the first intermediate carrier body to the first blade track segment, and a second turbine shroud segment arranged circumferentially adjacent to the first turbine shroud segment, the second turbine shroud segment including a second carrier, a second blade track segment, and a second intermediate carrier configured to couple the second blade track segment to the second carrier, the second blade track segment formed to include a second runner shaped to extend circumferentially partway around the center axis and a second attachment portion that extends radially outward from the second runner, and the second intermediate carrier includes a second intermediate carrier body arranged adjacent to the second attachment portion and a second intermediate carrier pin that extends axially through the first attachment portion and the second intermediate carrier body to couple the second intermediate carrier body to the second blade track segment, wherein the second intermediate carrier body is shaped to define a flange that extends circumferentially from a circumferential end of the second intermediate carrier body into a groove formed in an adjacent circumferential end of the first intermediate carrier body so that the first intermediate carrier pin extends axially through the first intermediate carrier body and the flange of the second intermediate carrier body to form a joint between the first intermediate carrier and the second intermediate carrier.

11. The turbine shroud of claim 10, wherein the first intermediate carrier further includes a plurality of first intermediate carrier retainers that each extend radially and couple the first intermediate carrier body with the carrier, and the second intermediate carrier further includes a plurality of second intermediate carrier retainers that each extend radially and couple the second intermediate carrier body with the carrier.

12. The turbine shroud of claim 11, wherein the second intermediate carrier body is shaped to include a forward side surface and an aft side surface spaced apart axially from the forward side surface, the circumferential end extends between and interconnects the forward side surface and the aft side surface, and edges of the flange are spaced apart axially from the forward side surface and the aft side surface of the second intermediate carrier body.

13. The turbine shroud of claim 11, wherein the first intermediate carrier body is shaped to include a flange that extends circumferentially from the adjacent circumferential end of the first intermediate carrier body to form the groove, the flange of the first intermediate carrier body extends into a groove formed by the flange of the second intermediate carrier body to engage the flange of the second intermediate carrier body.

14. The turbine shroud of claim 13, wherein the flange of the second intermediate carrier body axially overlaps the flange of the first intermediate carrier body such that the one pin of the at least two first intermediate carrier pins extends axially through the flange of the first intermediate carrier body and the flange of the second intermediate carrier body to form the joint.

15. The turbine shroud of claim 10, wherein edges of the flange of the second intermediate carrier are spaced apart axially from edges of the circumferential end of the second intermediate carrier body.

16. The turbine shroud of claim 10, wherein the first intermediate carrier body is shaped to include a flange that extends circumferentially from the adjacent circumferential end of the first intermediate carrier body to form the groove, the flange of the first intermediate carrier body extends into a groove formed by the flange of the second intermediate carrier body to engage the flange of the second intermediate carrier body, and the one pin of the at least two first intermediate carrier pins extends axially through the flange of the first intermediate carrier body and the flange of the second intermediate carrier body to form the joint.

17. A method comprising
providing a plurality of blade track segments, a plurality of intermediate carrier bodies, and a plurality of intermediate carrier pins, each blade track segment including a runner shaped to extend partway around an axis, a fore mount post that extends radially outward from the first runner, and an aft mount post spaced apart axially from the fore mount post that extends radially outward from the runner, arranging a first intermediate carrier body of the plurality of intermediate carrier bodies axially between the fore mount post and the aft mount post of a first blade track segment included in the plurality of blade track segments, inserting the one pin of the plurality of intermediate carrier pins axially through the fore mount post, the first intermediate carrier body, and the aft mount post to couple the first blade track segment to the first intermediate carrier body, arranging a second intermediate carrier body circumferentially adjacent to the first intermediate carrier body so that a flange formed by the second intermediate carrier body extends into a groove formed in the first intermediate carrier body, inserting another pin of the plurality of intermediate carrier pins axially through the fore mount post, the first intermediate carrier body, the flange of the second intermediate carrier body, and the aft mount post to couple the first blade track segment to the first intermediate carrier body and the second intermediate carrier body, repeating the previous steps until the assembled plurality of blade track segments and plurality of intermediate carrier bodies form a full hoop turbine shroud, and arranging the full hoop turbine shroud in a gas turbine engine.

18. The method of claim 17, wherein each of the plurality of intermediate carrier body is shaped to form at least two intermediate carrier retainers that each extend radially from the intermediate carrier body, and wherein the step of arranging the full hoop turbine shroud in the gas turbine engine includes aligning the at least two intermediate carrier retainers of each intermediate carrier body of the plurality of intermediate carrier bodies with corresponding holes and coupling the at least two intermediate carrier retainers of each intermediate carrier body of the plurality of intermediate carrier bodies with a carrier included in the gas turbine engine.

19. The method claim 18, wherein edges of the flange included in each intermediate carrier body of the plurality of intermediate carrier bodies are spaced apart axially from edges of a circumferential end of the intermediate carrier body.

20. The method of claim 18, wherein the first intermediate carrier body is shaped to include a flange that extends circumferentially from the adjacent circumferential end of the first intermediate carrier body to form the groove, the flange of the first intermediate carrier body extends into a groove formed by the flange of the second intermediate carrier body to engage the flange of the second intermediate carrier body, and the one pin of the at least two first intermediate carrier pins extends axially through the flange of the first intermediate carrier body and the flange of the second intermediate carrier body to form the joint.

* * * * *